(12) United States Patent
Alsaif et al.

(10) Patent No.: US 11,795,914 B1
(45) Date of Patent: Oct. 24, 2023

(54) SELF-EXCITED WIND POWER SYSTEM WITH A THREE SEGMENTED PANELS

(71) Applicant: Khalid Alsaif, Riyadh (SA)

(72) Inventors: Khalid Alsaif, Riyadh (SA); Abdulrahman Al Khathlan, Riyadh (SA)

(73) Assignee: Khalid Alsaif, Riyadh (SA)

( * ) Notice: Subject to any disclaimer, the term of this patent is extended or adjusted under 35 U.S.C. 154(b) by 0 days.

(21) Appl. No.: 18/203,213

(22) Filed: May 30, 2023

(51) Int. Cl.
| | | |
|---|---|---|
| *F03D 13/20* | (2016.01) | |
| *F03D 17/00* | (2016.01) | |
| *F03D 15/00* | (2016.01) | |
| *F03D 9/25* | (2016.01) | |
| *H02K 7/18* | (2006.01) | |
| *H02K 7/116* | (2006.01) | |

(52) U.S. Cl.
CPC .............. *F03D 13/20* (2016.05); *F03D 9/25* (2016.05); *F03D 15/00* (2016.05); *F03D 17/00* (2016.05); *H02K 7/116* (2013.01); *H02K 7/183* (2013.01); *F05B 2220/706* (2013.01); *F05B 2250/283* (2013.01); *F05B 2260/4031* (2013.01)

(58) Field of Classification Search
CPC . F03D 13/20; F03D 9/25; F03D 15/00; F03D 17/00; H02K 7/116; H02K 7/183; F05B 2220/706; F05B 2250/283; F05B 2260/4031
See application file for complete search history.

(56) References Cited

U.S. PATENT DOCUMENTS 8,382,435 B2 * 2/2013 Deeley ................... F03D 3/068
415/4.4

* cited by examiner

*Primary Examiner* — Viet P Nguyen
(74) *Attorney, Agent, or Firm* — Bay State IP, LLC

(57) ABSTRACT

A self-excited wind power system with at least one self-excited panel, each arranged to create periodic motion in response to wind velocity, and a support tower. The self-excited panel is segmented, with at least three segments: a first segment forming a master segment, a second segment, and a third segment defining a tail segment. The first segment of the self-excited panel has a first length and a first height, the second segment has a second length half the length of the first segment and a second height one-third the height of the first segment, and the third segment has a third length half the length of the first segment and a third height one-third the height of the first segment. Furthermore, the second and third segments are connected to the proximal and distal ends of the first segment via a bearing mechanism.

16 Claims, 6 Drawing Sheets

SELF-EXCITED WIND POWER SYSTEM WITH A THREE SEGMENTED PANELS

BACKGROUND

Field of invention

Embodiments of the present invention generally relate to a self-excited wind power system and more particularly to a self-excited panel of the self-excited wind power system that is used to convert wind energy to electric power.

Description of Related Art

Renewable energy sources, such as wind energy, have become increasingly important in recent years due to the need to reduce our reliance on non-renewable energy sources. Wind energy is derived from the force of the wind via wind turbines that convert the kinetic energy of the wind into electrical energy. Traditional horizontal-axis wind turbines have long rotor blades that are expensive and difficult to manufacture. Additionally, these wind turbines are sensitive to strong winds and harsh weather conditions, leading to increased maintenance costs. Moreover, the initial expenses of installing wind turbines can be high due to the need for large and heavy equipment, which may cause temporary disruption to the environment near the turbines.

To address these issues, there is a need for a new wind turbine design that is cost-effective, robust, and easy to manufacture.

SUMMARY

Embodiments of the present invention include a self-excited wind power system comprising at least one self-excited panel, each self-excited panel structured to create periodic motion in response to wind velocity. At least one self-excited panels have at least three segments, with the first segment defining a master segment, the second segment defining a tail segment, and the third segment defining another tail segment. A bearing mechanism connects the second and third segments to the proximal and distal ends of the first segment, respectively. The first segment of the self-excited panel is of a first length and a first height, the second segment has a second length and a second height, and the third segment has a third length and a third height. The second length of the self-excited panels' second segment is half the length of the first segment, and the second height is one-third the height of the first segment. Similarly, the third length of the self-excited panels' third segment is half the length of the first segment, and the third height is one-third the height of the first segment. Furthermore, utilizing a bearing mechanism, the first segment of at least one self-excited panels is rigidly connected to the upper shaft of the main shaft.

The self-excited wind power system has a support tower. The support tower includes a main shaft, which has an upper shaft and a bottom shaft. The upper shaft is protected by a top cover, while the bottom shaft is protected by a bottom cover. The bottom portion of the upper shaft and the top portion of the bottom shaft are linked by a ratchet.

The support tower also includes a clutch mechanism that is designed to lock said top cover with the upper shaft in response to signals from a tachometer that monitors the angular speed of at least one self-excited panels.

The support tower also includes a gearbox and a generator, with the gearbox comprising a main gear attached to the main shaft's bottom shaft.

Embodiments of the present invention propose a technique for using a self-excited wind power system. The method consists of the following steps: identifying an installation region with sufficient wind blowing throughout the year; installing various components together to form the final energy producing windmill; and submitting three segmented self-excited panels to wind to produce energy. Using a tachometer, monitor the angular speed of at least one self-excited panel to lock said top cover with the wind mill's upper shaft; enable rotation of the upper shaft in correlation with the rotation of the top cover; through a ratchet, convert a bidirectional oscillatory motion of the top shaft into a unidirectional rotation of the bottom shaft; rotate a primary gear of the gearbox attached to the bottom shaft; generate electricity through a generator connected to the gearbox.

Embodiments of the present invention may provide a number of advantages depending on its particular configuration. First, embodiments of the present application provide a self-excited wind power system with a unique styled self-excited panel.

Next, embodiments of the present application provide a self-excited wind power system that include a segmented self-excited panels having at least three segments.

Next, embodiments of the present application provide a self-excited wind power system with a self-excited panel that is less expensive than existing wind power systems.

Next, embodiments of the present application include a self-excited wind power system with a gearbox and generator located at the bottom of the tower to reduce stress created in the tower structure's exterior protection.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1:
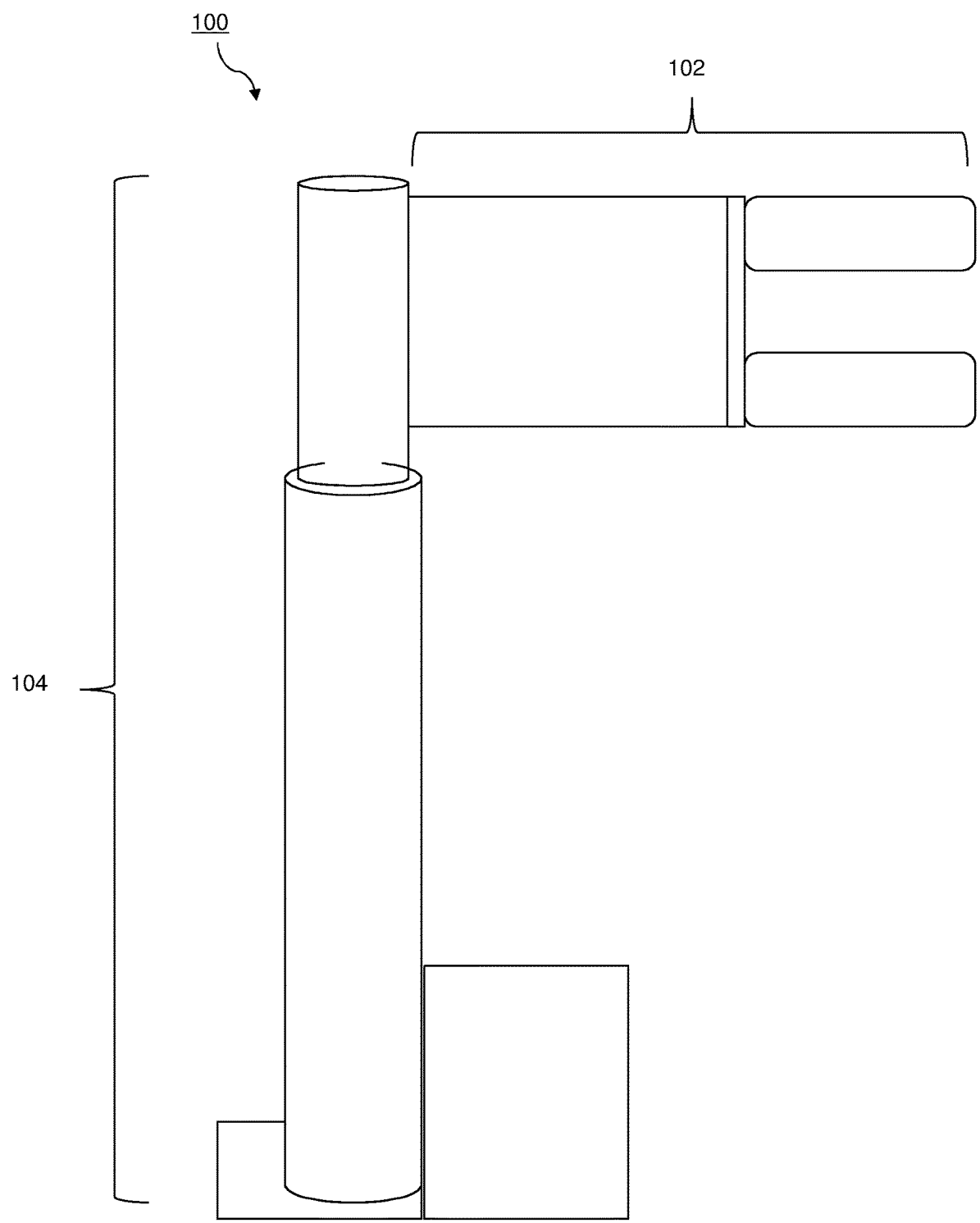
FIG. 1 shows a perspective view of a self-excited wind power system, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures. Optional portions of the figures may be illustrated using dashed or dotted lines unless the context of usage indicates otherwise.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," consists essentially of," and the like or the respective closed phrases "consisting of," "consists of, the like.

As used herein, the singular forms "a," "an," and "the" designate both the singular and the plural, unless expressly stated to designate the singular only.

Turning now to the figures in further depth, FIG. 1 depicts a perspective view of a self-excited wind power system 100 of the present invention. The self-excited wind power system 100 is comprised of a number of self-excited panels 102 that are pivotally attached to a support tower 104 in any customary manner. The self-excited wind power system 100 can have any additional supporting measures required to support it. Furthermore, the self-excited panels 102 will be connected to any standard means of storing the wind turbine's energy. It should also be noted that while only one self-excited panel 102 is depicted in FIG. 1, the present invention is not restricted to any particular number. The current invention could employ fewer or more self-excited panels 102 than illustrated in the drawings.

The self-excited panels 102 have a flag-like configuration that is unlike any other standard blade self-excited panels design. A bearing mechanism 108 connects the self-excited panels 102 to the main shaft 106 which is housed within the support tower 104. The support tower 104 is a two-part structure with a top cover 110 and a bottom cover 112. The top cover 110 and bottom cover 112 work together to create the illusion of a united support tower 104. Self-excited wind power system 100, like ordinary wind turbines, can be erected in any geographical area. A plain, a desert, a hilltop, a seashore, or a combination of these can constitute the geographical area. A predefined amount of land is required for the installation of the self-excited wind power system 100 in a geographical region, which will serve as a base for the installation of the power unit, tower structure. Depending on the size of the self-excited wind power system 100, large machinery such as an excavator and crane may not be required. It is standard procedure to wait for a length of time following foundation laying to allow the concrete base to cure. After establishing the foundation and waiting a predetermined amount of time, the wiring process can begin to connect the various components to the generator. Once connected, the self-excited wind power system 100 is ready to generate the desired amount of electricity in a more easy and trouble-free manner.

Figure 2:
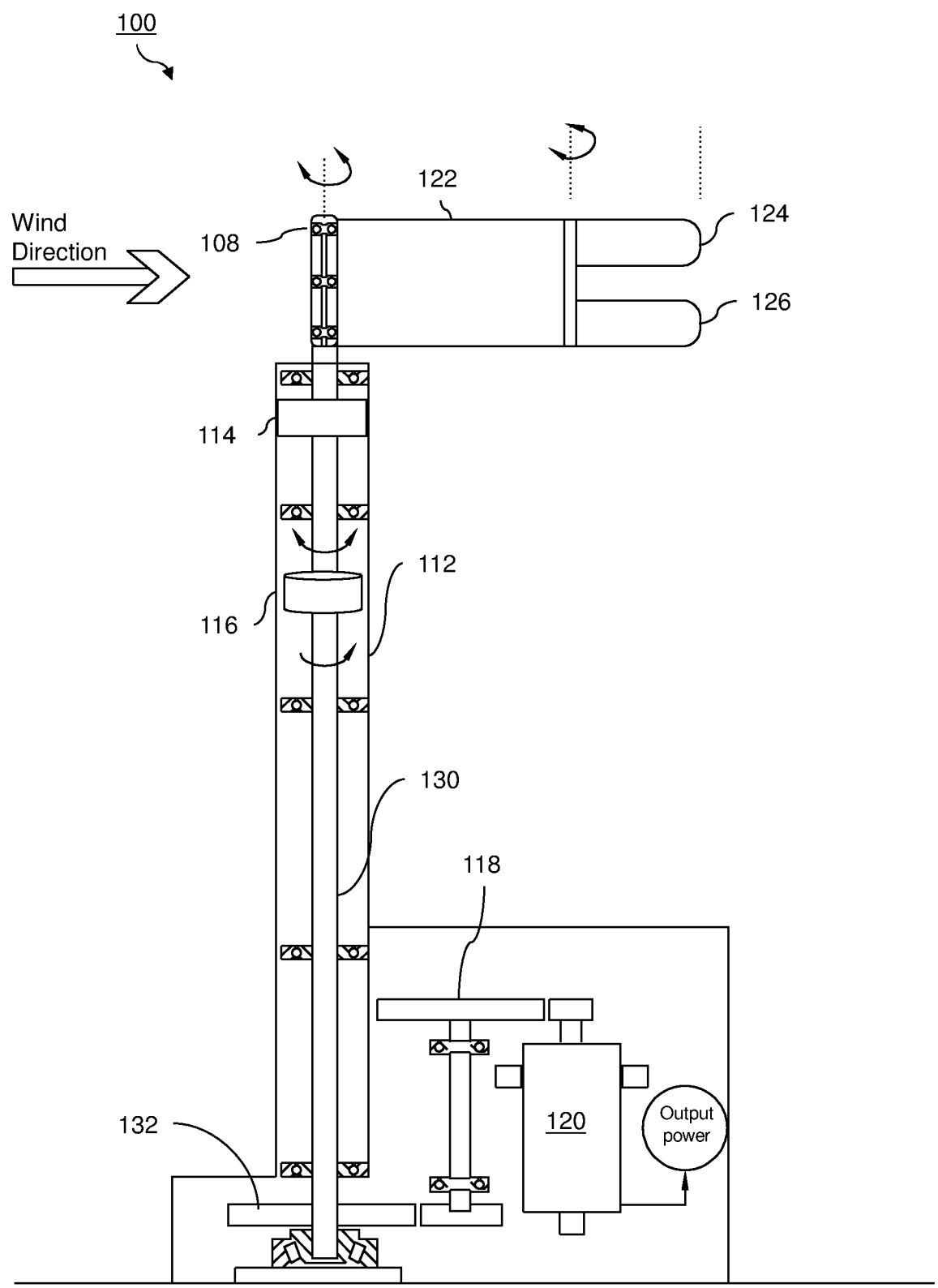
FIG. 2 depicts an internal view of components of the self-excited wind power system, according to an embodiment of the present invention.

FIG. 2 displays the internal connection of the self-excited wind power system 100's components. The components can be linked to provide the necessary amount of output. The self-excited wind power system 100 typically contains self-excited panels 102, a main shaft 106, a plurality of bearing mechanisms 108, top and bottom covers 110 and 112, a tachometer 114, a ratchet 116, a gear box 118, a generator 120, and other components.

The self-excited wind power system 100's self-excited panels 102 are designed to produce periodic motion in response to wind velocity. The self-excited wind power system 100 has at least one self-excited panels 102, according to implementations of the present invention. The number of self-excited panels 102 could be less or greater in the present invention. Each of the self-excited panels 102 is segmented, with at least three segments. A first section 122, a second segment 124, and a third segment 126 comprise the three segments. The first segment 122 defines a master segment, according to one embodiment of the present invention. Similarly, the second and third segments 124 each define a tail segment.

Additionally, the self-excited panels 102's first segment 122 has a first length and a first height. The first segment in an example has the first length of "L" and the first height of "H." Similarly, the second segment 124 has a second length and a second height. The second length of the second segment 124 is "L/2," and perhaps half of the first length of the first segment 122, and the second height is "H/3," or one-third of the first height of the first segment 122. Likewise, the third section 126 has a third length and a third height. The third length of segment 124 is "L/2," which is half the length of the first length of segment 122, and the third height is "H/3," which is one-third of the first height of segment 122.

A bearing mechanism 108 connects the second and third segments, 124 and 126, to the proximal and distal ends of the first segment, 122. A bearing mechanism is used to attach the second segment 124 to the proximal end of the first segment 122 in one embodiment of the present invention. A bearing mechanism 108 is used to attach the third segment 126 to the distal end of the first segment 122 in another embodiment of the present invention.

In addition, the first segment 122 of at least one self-excited panels 102 is rigidly linked to the main shaft 106's upper shaft 128. A bearing mechanism 108 is used in a preferred form of the present invention to rigidly connect the first segment 122 of at least one self-excited panels 102 to the upper shaft 128 of the main shaft 106. In addition, in accordance with FIG. 3, the connection of the first section 122 with the upper shaft 128 will be discussed in detail. The bearing mechanism 108 may be deep-groove ball bearings, an angular contact ball bearing, self-aligning ball bearings, thrust ball bearings, and so on. The present invention's embodiments are intended to incorporate or otherwise encompass any type of ball bearings 108, including known, related art, and/or subsequently developed technology. The ball bearing 108 in a preferred embodiment of the present invention is a low friction ball bearing.

Further, a ratchet 116 connects the bottom portion of an upper shaft 128 to the top section of a bottom shaft 130 in one embodiment of the present invention. The ratchet 116 is a mechanical device that allows continuous linear or rotary motion in one direction while preventing motion in the other. The ratchet 116 can be set to transform the top shaft 128's bi-directional oscillatory motion into a uni-directional rotation of the bottom shaft 130. The rotation of the gearbox 118 is caused by the unidirectional motion of the bottom shaft 130. In one example, the bottom shaft 130 rotates in one direction and is connected to the gearbox 118's primary gear 132. The main gear 132 is intended to increase the rotation speed required for the generator 120 to create enough electricity. The main gear 132 can be constructed to include the flywheel effect in order to maintain constant sustained rotation, which is accomplished by adding more mass to the gear, which also serves as a flywheel. To lessen the stress created in the exterior protection tower construction, the gearbox 118 and generator 120 are preferentially located towards the bottom of the tower 104. To alleviate stress in the tower structures outside protection, the gearbox 118 and generator 120 are situated at the bottom of the tower structure 104. According to one embodiment of the present invention, the generator 120 sits on the foundation's base and is connected via a series of wires to output the generated power. In another form of the present invention, the generator 120 is linked to a battery to store energy.

In addition, the bottom cover 112 has another set of bearing mechanisms along the length of it. The bearing mechanism 108 allows the main shaft 106 to move freely while keeping the covering stiff. As illustrated in FIG. 2, at least five bearing mechanisms 108 are arranged in the bottom region inside the bottom cover 112. The number of bearing mechanisms 108 may vary depending on the size of the main shaft 106.

Figure 3:
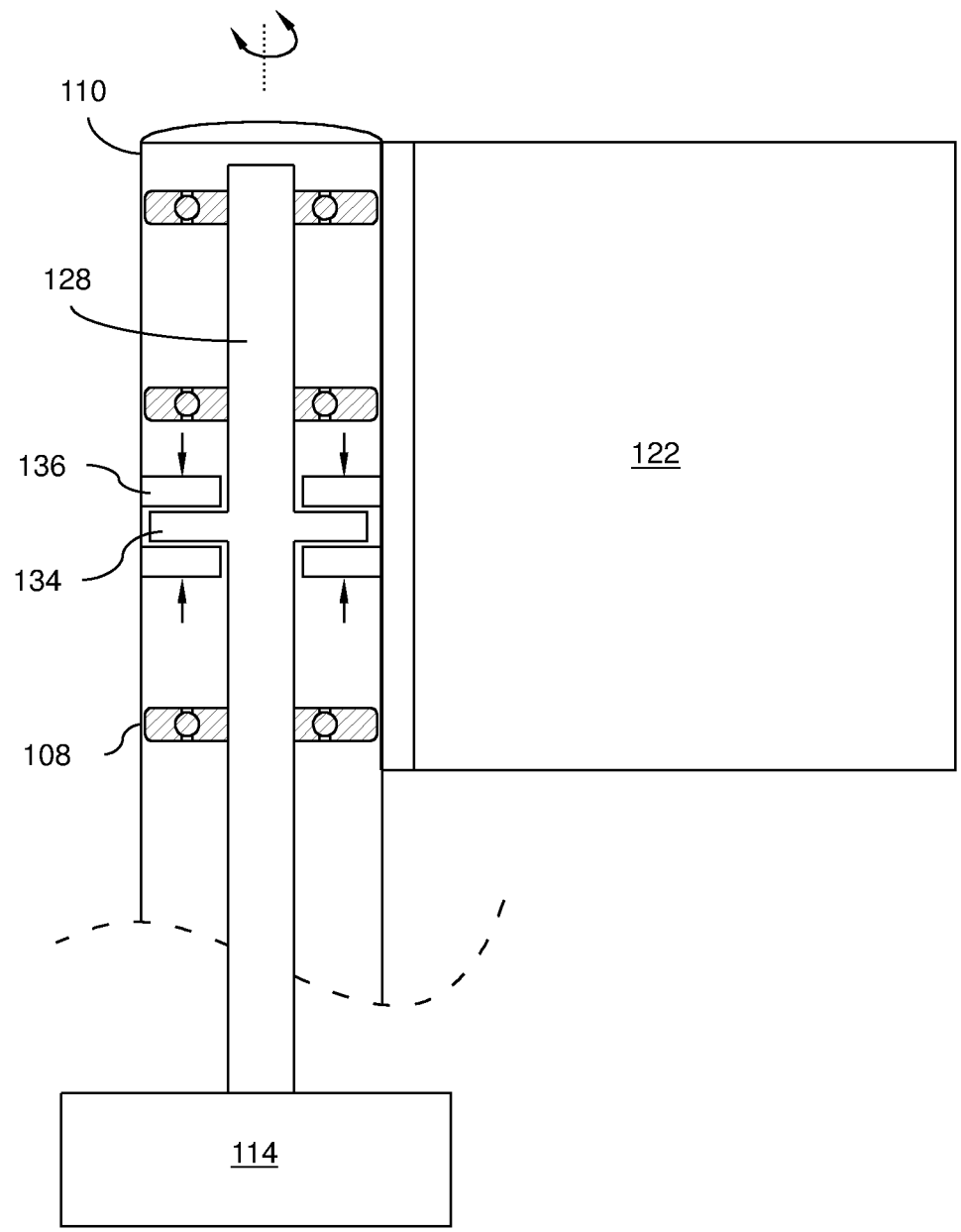
FIG. 3 depicts an internal clutch mechanism of the self-excited wind power system, according to embodiments of the present invention.

FIG. 3 displays an internal clutch mechanism 134 of a self-excited wind power system 100 in accordance with embodiments of the present invention. The clutch mechanism 134 is located on the upper shaft 128 of the self-excited wind power system 100, which is also enclosed under a top cover 110 that is attached to the first segment 122 of the self-excited panels 102. The first section 122 of the self-excited panels 102 is rigidly attached to the top cover 110, which rotates about the top shaft axis (as indicated in FIG. 3) of the main shaft 106 through a bearing mechanism 108. The bearing mechanism 108 is a low friction bearing in this example. The self-excited wind power system 100, according to implementations of the present invention, has at least three low friction bearings arranged around the upper shaft 128 inside the top cover 110. One of the three bearings is located at the upper shaft 128's top end. Another bearing is located near the clutch mechanism 134, and the final bearing is located beneath the clutch mechanism 134, above the tachometer 114.

The two tails of the self-excited panels 102, the second and third segments 124 and 126, have a space in between and are hinged utilizing low friction ball bearings near the end corners of the first segment 122, as shown in FIG. 1, and they rotate as a rigid body together. When the self-excited panels 102 are exposed to wind velocity, they interact with the flow and produce periodic motion. The second and third segments 124 and 126 function as restoring aerodynamic moments to maintain the angular vibrations of the honeycombed blades 102.

Furthermore, the minimal wind speed that causes vibrations, i.e. a critical speed Vc, is a function of the blade 102 dimensions, materials and tails length, height and materials employed, and joint friction. Because of the interaction between the flow and the movement of the first segment 122, as well as the two tails, the second segment 124 and third segment 126, this will be termed a self-excited system. If the wind speed goes above the critical speed, the periodic motion will continue. Once the oscillations of the first segment 122 begin, the angular speed is detected by the tachometer 114. The tachometer 114 is mounted to the higher shaft 128 as seen in FIGS. 2 and 3. The tachometer 114 will be arranged in accordance with implementations of the present invention to create a signal for the clutch mechanism 134 to lock the top cover 110. The top cover 110 will be locked to the top portion of the upper shaft 128 utilizing an actuator 136 and an internal clutch mechanism, as shown in FIG. 2. The higher shaft 128 will thereafter perform the same periodic angular motion as the first section 122. With the ratchet 116, this oscillatory motion will be transformed to a single directional rotation of the bottom shaft 130. The uni directional rotation of the bottom shaft 130 connected to the ratchet 116 will rotate the main gear 132 of the gearbox 118. The gearbox 118 as configured will increase the rotation speed needed for the generator 120 to produce electricity. The main gear 132 is designed to include the flywheel effect as to maintain steady sustained rotation of the gearbox 118.

Figure 4:
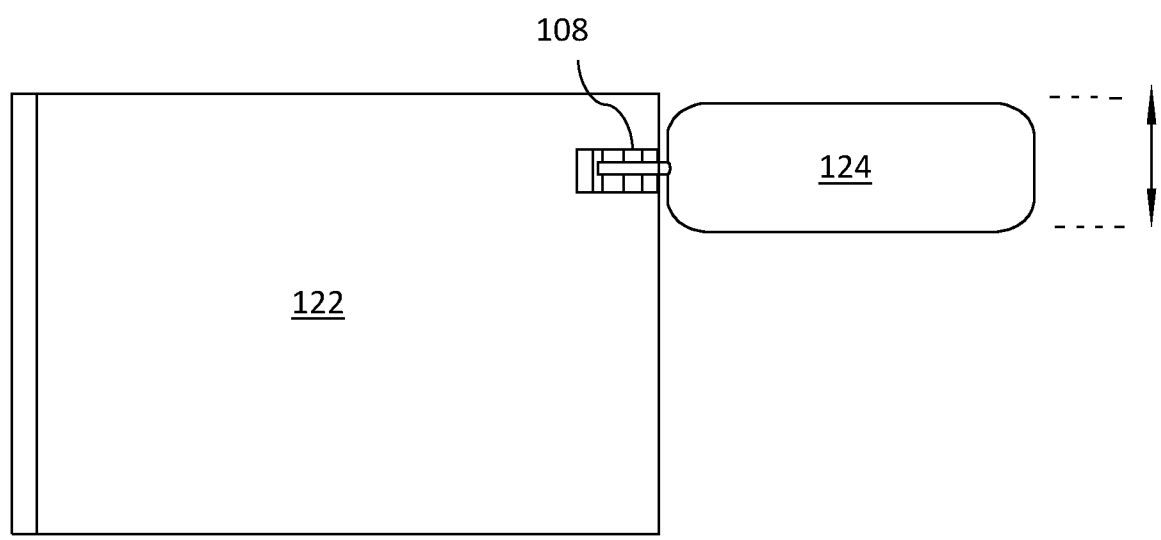
FIG. 4 depicts an illustrative example of an attachment of one of a second segment or the third segment with the first segment, according to an embodiment of the present invention.

FIG. 4 displays the attachment of one of the second or third segments to the first segment 122, according to one embodiment of the present invention. The second and third segments 124 and 126 have the same shape and size and are attached to the first segment 122 in the same way.

The attachment of the second segment 124 is described in detail in FIG. 4. The second segment 124, like the first segment 122, is composed of a honeycomb structure sandwiched between a top and bottom panel (shown in FIG. 5). The second segment 124 has a different length and height. The second length of the second segment 124 is "L/2," or half of the first length of the first segment 122, and the second height is "H/3," or one-third of the first height of the first segment 122. The bearing mechanism 108 connects the second segment 124 to the proximal end of the first segment 122 due to its one-third height. The bearing mechanism 108 permits the second segment 124 to freely rotate in a clockwise direction. The bearing mechanism 108 in another embodiment of the present invention allows the second segment 124 to move freely in an anti-clockwise direction. The bearing mechanism 108 in a preferred form of the present invention allows the second segment 124 to engage with the flow of wind and produce periodic motion. The addition of the second segment 124 to the proximal end of the first segment 122 is significant because it assists the first member 122 in sustaining the vibrations caused by aerodynamic forces.

Figure 5:
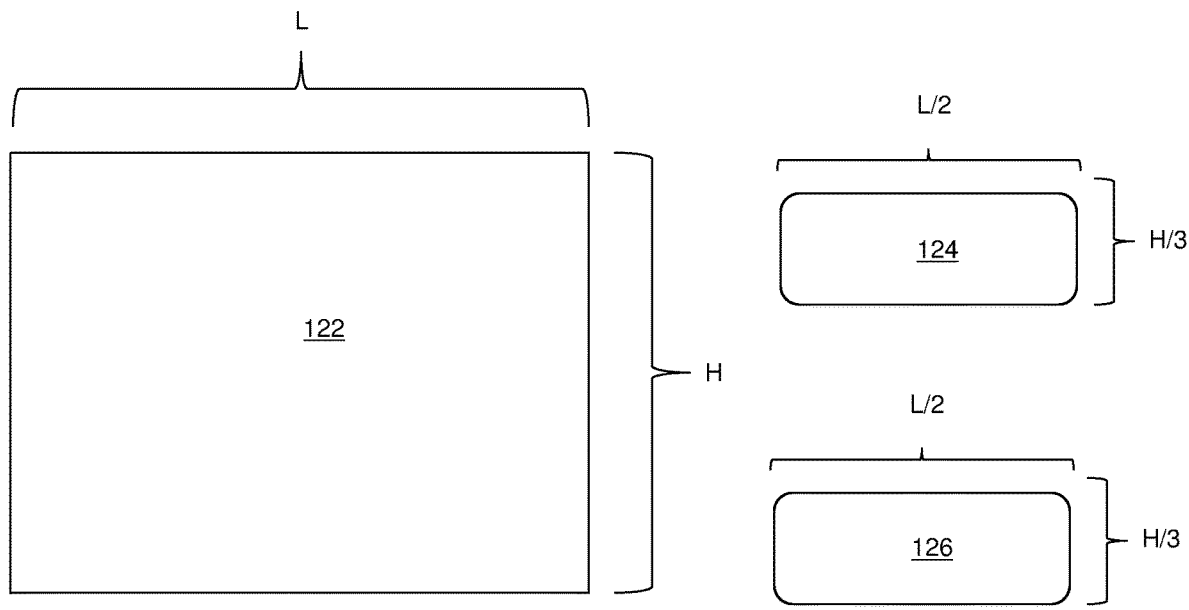
FIG. 5 displays an internal composition of the first segment, second segment, and third segment, according to an embodiment of the present invention.
Figure 5:
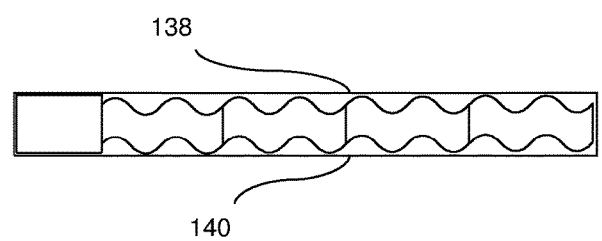

Similarly, to the first segment 122, the third segment 126 is composed of a honeycomb structure sandwiched between a top and bottom panel (shown in FIG. 5). The third section 126 is the third in length and height. The third length of segment 126 is "L/2," which is half the length of the first length of segment 122, and the third height is "H/3," which is one-third of the first height of segment 122. The bearing mechanism 108 connects the third segment 126 to the distal end of the first segment 122 due to its one-third height. The bearing mechanism 108 permits the third segment 126 to rotate freely in a clockwise direction. In another aspect of the present invention, the bearing mechanism 108 permits the third segment 126 to rotate freely in an anti-clockwise orientation. In a preferred form of the present invention, the bearing mechanism 108 allows the third segment 126 to engage with the flow of wind and produce periodic motion. The addition of the third segment 126 to the proximal end of the first segment 122 is significant because it enables the first member 122 tolerate the vibrations caused by aerodynamic forces.

FIG. 5 displays the internal composition of the first segment 122, second segment 124, and third segment 126 in accordance with implementations of the present invention.

The first segment 122 of the self-excited panels 102 is a honeycomb construction sandwiched between top and bottom panels 138 and 140. The top panel 138 of the present invention may be composed of aluminum, a composite plastic, or other materials. The present invention's embodiments are intended to incorporate or cover any sort of material, including known, related art, and/or subsequently developed technology. Whichever material is used, the major goal is to keep the segment's weight to a minimum while maintaining a high level of rigidity. Furthermore, as shown in FIG. 5, the first section 122 is made with a first length and a first height. The first length is "L" and the first height is "H".

Similarly, the second section 124 of the self-excited panels 102 is constructed up of a honeycomb structure sandwiched between top and bottom panels 138 and 140. The top panel 138 of the present invention may be composed of aluminum, a composite plastic, or other materials. The present invention's embodiments are intended to incorporate or cover any sort of material, including known, related art, and/or subsequently developed technology. Whichever material is used, the major goal is to keep the segment's weight to a minimum while maintaining a high level of rigidity. Furthermore, as shown in FIG. 5, the second section 124 is made with the second length and height. The second length is "L/2" and the second height is "H/3".

Similarly, the third segment 126 of the self-excited panels 102 is constructed up of a honeycomb structure sandwiched between top and bottom panels 138 and 140. The top panel 138 of the present invention may be composed of aluminum, a composite plastic, or other materials. The present invention's embodiments are intended to incorporate or cover any sort of material, including known, related art, and/or subsequently developed technology. Whichever material is used, the major goal is to keep the segment's weight to a minimum while maintaining a high level of rigidity. Furthermore, as shown in FIG. 5, the third section 126 has the third length and third height. The second length is "L/2" and the second height is "H/3".

Figure 6:
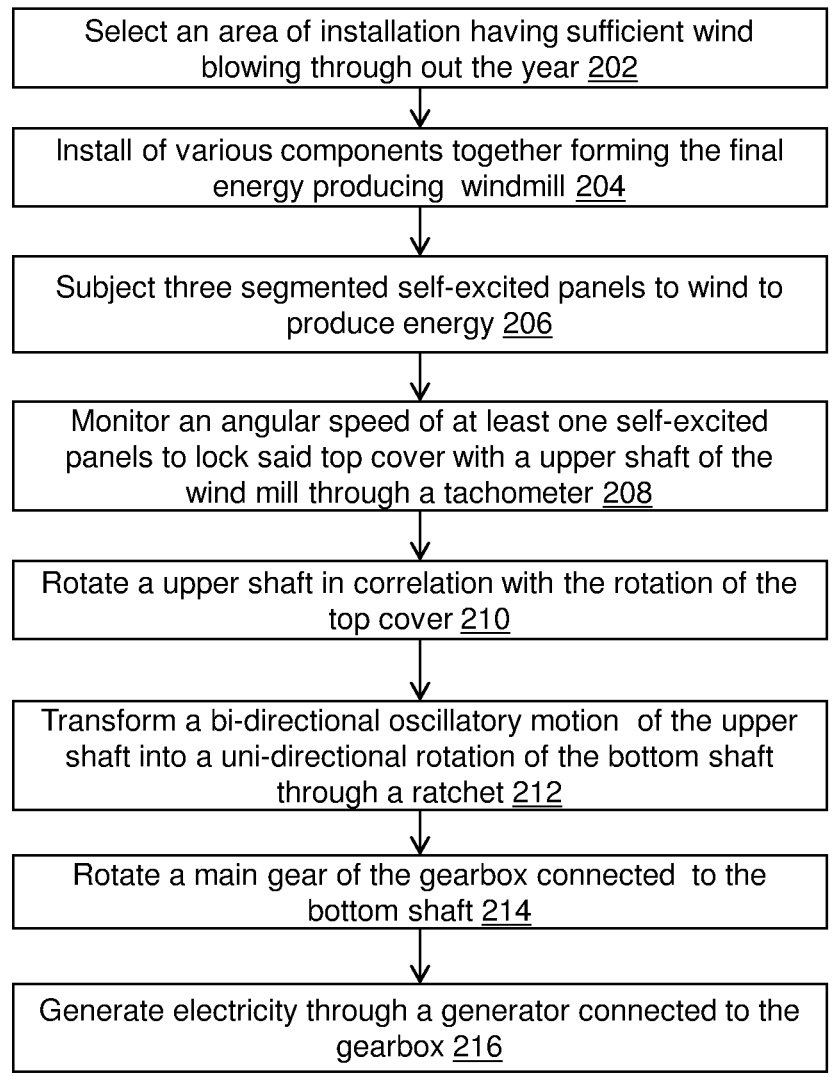
FIG. 6 illustrates a method of use of the self-excited wind power system, according to an embodiment of the present invention.

FIG. 6 illustrates a method of use of the self-excited wind power system 100, according to an embodiment of the present invention.

At step 202, a suitable geographical place for the installation of the self-excited wind power system 100 is chosen, which should have a sufficient flow of wind throughout the year. The geographical area can be a plain, a desert, a hilltop, a coastline, or a combination of these.

Following the selection of the geographical area, the components are carried to the selected area using a suitable transport means in accordance with step 204. The components are assembled to make the self-excited wind power system 100 after shipping.

At step 206, at least one of the three segmented rotor blades 102 is exposed to wind in order to generate energy. A master segment is defined by first segment 122, a tail segment is defined by second segment 124, and another tail segment is defined by third segment 126.

In step 208, the angular speed of at least one of the self-excited panels 102 is measured using a tachometer 114. The tachometer 114 is programmed to connect the top cover 110 to the upper shaft 128 of the self-excited wind power system 100.

At step 210, the upper shaft 128 rotates in sync with the rotation of the top cover 110.

At step 212, a ratchet 116 linked to the bottom portion of the upper shaft 128 and the top portion of the bottom shaft 130 converts the upper shaft 128's bi-directional oscillatory motion into the bottom shaft 130's uni-directional rotation.

In step 214, a main gear 132 attached to the bottom shaft 130, which is further coupled to a gearbox 118, is rotated. The main gear 132 is set up to accelerate the rotation of the gearbox 118.

At step 216, a generator 120 generates power as a result of the rotation of the gearbox 118. The gearbox is attached to the generator 120, which produces electricity.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements within substantial differences from the literal languages of the claims.

We claim:

1. A self-excited wind power system, the system comprising:
   at least one self-excited panel, each self-excited panels configured to produce periodic motion subjected to wind velocity; and
   a support tower, the support tower further comprises a main shaft, the main shaft including an upper shaft and a bottom shaft;
   wherein each of the at least one self-excited panel has a segmented configuration with at least three segments, the three segments being a first segment defining a master segment, a second segment defining a tail segment, and a third segment defining a tail segment;
   wherein the second and third segments are attached to the proximal and distal ends of the first segment through a bearing mechanism, respectively; and
   wherein the first segment of the at least one self-excited panel is rigidly coupled to the upper shaft of the main shaft using a bearing mechanism.

2. The self-excited wind power system as claimed in claim 1, the upper shaft is housed in a top cover and the bottom shaft is housed in a bottom cover.

3. The self-excited wind power system as claimed in claim 2, further comprising a clutch mechanism, the clutch mechanism is adapted to lock said top cover with the upper shaft upon receiving signals from a tachometer configured to monitor an angular speed of the at least one self-excited panel.

4. The self-excited wind power system as claimed in claim 1, wherein a bottom portion of the upper shaft and a top portion of the bottom shaft are connected to each other through a ratchet.

5. The self-excited wind power system as claimed in claim 1, the first segment of the self-excited panel has a first length and a first height, the second segment has a second length and a second height, and the third segment has a third length and a third height.

6. The self-excited wind power system as claimed in claim 5, wherein the second length of the second segment of the self-excited panel is half the length of the first segment and the second height is one third the height of the first segment, respectively.

7. The self-excited wind power system as claimed in claim 5, wherein the third length of the third segment of the self-excited panel is half the length of the first segment and the third height is one third the height of the first segment, respectively.

8. The self-excited wind power system as claimed in claim 1, further comprising a gearbox and a generator, said gearbox including a main gear is connected to the bottom shaft of the main shaft.

9. The self-excited wind power system as claimed in claim 1, the self-excited panels are made up of a honeycomb structure sandwiched inside a top panel and a bottom panel.

10. The self-excited wind power system as claimed in claim 1, the self-excited panels are made up of a material selected from, aluminum, a composite plastic, or a combination thereof.

11. A self-excited wind power system comprising:
at least one self-excited panel, each self-excited panel configured to produce periodic motion subjected to wind velocity; and
a support tower, the support tower further comprises a main shaft, the main shaft including an upper shaft housed in a top cover and a bottom shaft housed in a bottom cover;
wherein each of the at least one self-excited panel has a segmented configuration with at least three segments, the three segments being a first segment defining a master segment, a second segment defining a tail segment, and a third segment defining a tail segment;
wherein the second and third segments are attached to the proximal and distal ends of the first segment through a bearing mechanism, respectively;
wherein the first segment of the at least one self-excited panel is rigidly coupled to the upper shaft of the main shaft using a bearing mechanism; and
wherein the first segment of the self-excited panel has a first length and a first height, the second segment of the self-excited panel has a second length half of the first segment's length and a second height one-third of the first segment's height, and the third segment of the self-excited panel has a third length half of the first segment's length and a third height one-third of the first segment's height, respectively.

12. The self-excited wind power system as claimed in claim 11, wherein a bottom portion of the upper shaft and a top portion of the bottom shaft are connected to each other through a ratchet.

13. The self-excited wind power system as claimed in claim 11, further comprising a clutch mechanism, the clutch mechanism is adapted to lock said top cover with the upper shaft upon receiving signals from a tachometer.

14. The self-excited wind power system as claimed in claim 11, further comprising a gearbox and a generator, said gearbox including a main gear is connected to the bottom shaft of the main shaft.

15. The self-excited wind power system as claimed in claim 11, the self-excited panels are composed of a honeycomb structure placed between a top and bottom plate.

16. The self-excited wind power system as claimed in claim 11, the self-excited panels are made up of a material selected from aluminum, a composite plastic, or a combination thereof.

* * * * *